US010372798B2

(12) United States Patent
Nordine et al.

(10) Patent No.: US 10,372,798 B2
(45) Date of Patent: Aug. 6, 2019

(54) SYSTEM AND METHODS FOR WEB-BASED CONTROL OF DESKTOP APPLICATIONS

(75) Inventors: Troy Douglas Nordine, Hastings, MN (US); Bart Matzek, Prescott, WI (US); Richard N. Dauk, Apple Valley, MN (US); Anudeep Parhar, Eagan, MN (US)

(73) Assignee: THOMSON REUTERS GLOBAL RESOURCES UNLIMITED COMPANY (CH)

( * ) Notice: Subject to any disclaimer, the term of this patent is extended or adjusted under 35 U.S.C. 154(b) by 411 days.

(21) Appl. No.: 12/501,238

(22) Filed: Jul. 10, 2009

(65) Prior Publication Data
US 2010/0115401 A1     May 6, 2010

Related U.S. Application Data

(60) Provisional application No. 61/134,669, filed on Jul. 11, 2008.

(51) Int. Cl.
*G06F 17/24* (2006.01)

(52) U.S. Cl.
CPC .................................... *G06F 17/24* (2013.01)

(58) Field of Classification Search
CPC ........... G06F 17/2235; G06F 17/30014; G06F 17/30017; G06F 17/211; G06F 17/2229; G06F 2209/541; G06F 9/4428; G06F 9/465; G06F 17/222; G06F 2209/5419; G06F 17/24
(Continued)

(56) References Cited

U.S. PATENT DOCUMENTS 5,581,686 A * 12/1996 Koppolu et al. ............... 715/784
5,664,133 A *  9/1997 Malamud .............. G06F 3/0482
                                                      345/902
(Continued)

FOREIGN PATENT DOCUMENTS

CA     2 730 207 A1    1/2010
EP     2 300 937 A1    3/2011
(Continued)

OTHER PUBLICATIONS

International Search Report and Written Opinion for PCT/US2009/004024, dated Dec. 3, 2009.
(Continued)

*Primary Examiner* — Wilson W Tsui
(74) *Attorney, Agent, or Firm* — Thomas Reuters (57) ABSTRACT

The present inventors devised, among other things, systems, methods, and software that allow users to readily access online legal research tools, while using other applications, such as word processors. One exemplary computer-implemented system provide an add-on software framework that integrates into a host word-processing application on a client access device. The add-on software framework allows users to select from an expandable listing of one or more web applications on a web server, with each of the web application capable of controlling operation of the host word processing application. The web applications facilitate extraction and access to information from the information-retrieval services and incorporation of the information in the document or in metadata associated with the document.

17 Claims, 3 Drawing Sheets

(58) Field of Classification Search
USPC ....... 715/200, 201, 205, 208, 209, 243, 248, 715/738, 744, 748
See application file for complete search history.

(56) References Cited

U.S. PATENT DOCUMENTS

| | | | | |
|---|---|---|---|---|
| 5,754,939 | A | * | 5/1998 | Herz ................... G06Q 20/383 348/E7.056 |
| 6,014,702 | A | * | 1/2000 | King et al. .................... 709/227 |
| 6,647,410 | B1 | | 11/2003 | Scimone et al. |
| 6,847,987 | B2 | * | 1/2005 | Case et al. .................... 709/203 |
| 7,003,719 | B1 | * | 2/2006 | Rosenoff et al. ............. 715/205 |
| 7,133,862 | B2 | * | 11/2006 | Hubert .............. G06F 17/30011 |
| 7,493,397 | B1 | * | 2/2009 | Guthrie et al. ............... 709/227 |
| 7,529,756 | B1 | * | 5/2009 | Haschart ........... G06F 17/30728 |
| 7,770,180 | B2 | * | 8/2010 | Villaron et al. ............. 719/313 |
| 8,019,769 | B2 | * | 9/2011 | Rolle .................. G06F 17/2775 707/755 |
| 2002/0065849 | A1 | * | 5/2002 | Ferguson et al. ............. 707/513 |
| 2002/0120680 | A1 | * | 8/2002 | Greco .................... G06Q 10/10 709/203 |
| 2003/0204367 | A1 | | 10/2003 | Hartigan et al. |
| 2005/0039141 | A1 | * | 2/2005 | Burke .............. G06F 17/30899 715/810 |
| 2005/0228788 | A1 | * | 10/2005 | Dahn .................. G06F 17/3066 |
| 2005/0240653 | A1 | | 10/2005 | Anglero |
| 2005/0251797 | A1 | * | 11/2005 | Omiya ...................... G06F 8/70 717/165 |
| 2007/0022155 | A1 | * | 1/2007 | Owens et al. ................ 709/202 |
| 2007/0078953 | A1 | * | 4/2007 | Chai et al. .................... 709/219 |
| 2007/0220417 | A1 | | 9/2007 | Mathew et al. |
| 2008/0071803 | A1 | * | 3/2008 | Boucher .............. G06F 17/211 |
| 2009/0125544 | A1 | * | 5/2009 | Brindley ........... G06F 17/30038 |

FOREIGN PATENT DOCUMENTS

| | | |
|---|---|---|
| WO | 2005081150 A1 | 9/2005 |
| WO | 2010/005587 A1 | 1/2010 |

OTHER PUBLICATIONS

International Preliminary Report on Patentability and Written Opinion issued in corresponding PCT Application No. PCT/US2009/004024, dated Jan. 20, 2011, 7 pages.
First Office Action dated Oct. 9, 2015, issued in corresponding Canadian Patent Application No. 2730207.
Response to First Office Action dated Mar. 31, 2016 filed in corresponding Canadian Patent Application No. 2730207.
Second Office Action dated Aug. 11, 2016, issued in corresponding Canadian Patent Application No. 2730207.
Response to Second Office Action dated Jan. 18, 2017 filed in corresponding Canadian Patent Application No. 2730207.
Office Action dated Mar. 10, 2017, issued in corresponding European patent application No. 09788894.5, 10 pages.
First Office Action dated Jan. 18, 2017, issued in corresponding Canadian Patent Application No. 2730207.
Notice of Allowance dated Jul. 4, 2017, issued in corresponding Canadian Patent Application No. 2730207, 5 pages.
Response to Office Action filed dated Jul. 4, 2017, issued in corresponding European patent application No. 09788894.5, 12 pages.
Office Action dated Sep. 6, 2017, issued in corresponding European patent application No. 09788894.5, 10 pages.
Kamp et al., "Real-Time Applications with Java and CORBA", Java Developer's Journal, Jan. 1, 2004, Retrieved from the Internet:URL:http://www2.sys-con.com/itsg/virtualcd/java/archives/0411/kamp/index.html, 7 pages.

* cited by examiner

SYSTEM AND METHODS FOR WEB-BASED CONTROL OF DESKTOP APPLICATIONS

CROSS-REFERENCE TO RELATED APPLICATIONS

This application claims priority to U.S. Provisional Application 61/134,669, which was filed on Jul. 11, 2008 and which is incorporated herein by reference. Additionally, U.S. patent application Ser. No. 11/897,995, which was filed on Aug. 30, 2007, is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2008, Thomson Global Resources.

TECHNICAL FIELD

Various embodiments of the present invention concern information-retrieval systems, such as those that provide legal documents or other related content, and user interfaces for such systems.

BACKGROUND

Judges and lawyers within the American legal system, as well as many others across the globe, are continually researching an ever-expanding body of legislation and judicial opinions to assist them understanding and resolving new or potential disputes. To facilitate this research, companies, such as West Publishing Company of St. Paul, Minn. (doing business as Thomson West), collect legal statutes, judicial opinions, law articles, and other legal and non-legal materials and make these available electronically over a computer network, through the Westlaw™ online research system. (Westlaw is a trademark licensed to Thomson West.)

At least one problem the present inventors recognized with this powerful system as well as other online research systems is that their valuable functionality is highly segregated from the functionality of other computer applications. For instance, legal researchers typically use results of their online legal research as part of a larger process of producing documents, such as legal briefs and memoranda. However, systems, such as the Westlaw system, are typically functionally separated from popular word processing applications, such as Microsoft Word or Corel WordPerfect, that are used for creating these documents.

Although adds-ons such as West BriefTools™ software and West CiteLink™ software are available to identify, mark, verify, tabulate, link, and/or indicate status of legal citations in word processor documents, their functionality is isolated to legal citations. This means that for other types of legal informational needs users must leave the context of the word-processing application to execute searches via browsers or other search tools and then cut and paste information from their browsers or other search interfaces into the documents. Moreover, the inventors recognized that conventional techniques for expanding the functionality of word-processing applications using customized add-ons requires adding fully customized software to the computer hosting the word-processing application. This approach, however, is inefficient as an information services company, such as Thomson Reuters, wants to offer a growing set of add-ons, such as West BriefTools and WestCiteLink software, to its customers.

Accordingly, the present inventors have recognized at least a need for improving functional integration of information-retrieval systems, such as Westlaw, into other applications, such as word processors.

SUMMARY

To address this and/or other needs, the present inventors devised, among other things, systems, methods, and software that allow users to readily access informational resources, such as an online legal research tools, while using other applications, such as word processors. One exemplary computer-implemented system provides an add-on software framework that integrates into a host word-processing application on a client access device. The add-on software framework allows users to select from one or more web applications on a web server, with each of the web application capable of controlling operation of the host word processing application (via appropriate APIs and an embedded browser control with framework). The web applications facilitate access to information from the information-retrieval services and incorporation of the information in the document or in metadata associated with the document.

DETAILED DESCRIPTION OF EXEMPLARY EMBODIMENTS

This description, which references and incorporates the above-identified Figures, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Overview

The exemplary method and system described provides, among other things, software platform components that enable an application to perform several functions without leaving the document and the host application. Essentially, the document could become a software platform. These functions include:
  Context
    The system for example extracts key context indicators such as document type (memo, pleading, agreement etc), jurisdiction and governing law (Orange County, New York etc.) and stores them, for example, in a data structure logically associated with the user and/or the document. In some embodiments, a document identifier is also stored to uniquely associate the document with the user. Some embodiments store the data as metadata linked to the document; others within subscriber data for an online legal research service (or a professional information research service).

Presenting relevant content options to user, based on the context of the document being drafted. Examples:
Automatically extract jurisdiction, document type and title from the document and allow searching similar content on WestLaw® or WestLaw® Business.
Extract key legal entities from the document and use them to enhance the document by adding relevant content
Automatically extract judge and party names, link automatically to profiles
Citations—extract and validate, KC Flags (West BriefTools®, West km®)
Citations—Advise on citation format (CiteAdvisor®)
Manage Workflow
Allow users to use predefined Litigation and Transactional workflows to track progress

Exemplary Document-Processing and Information-Retrieval System

Figure 1:
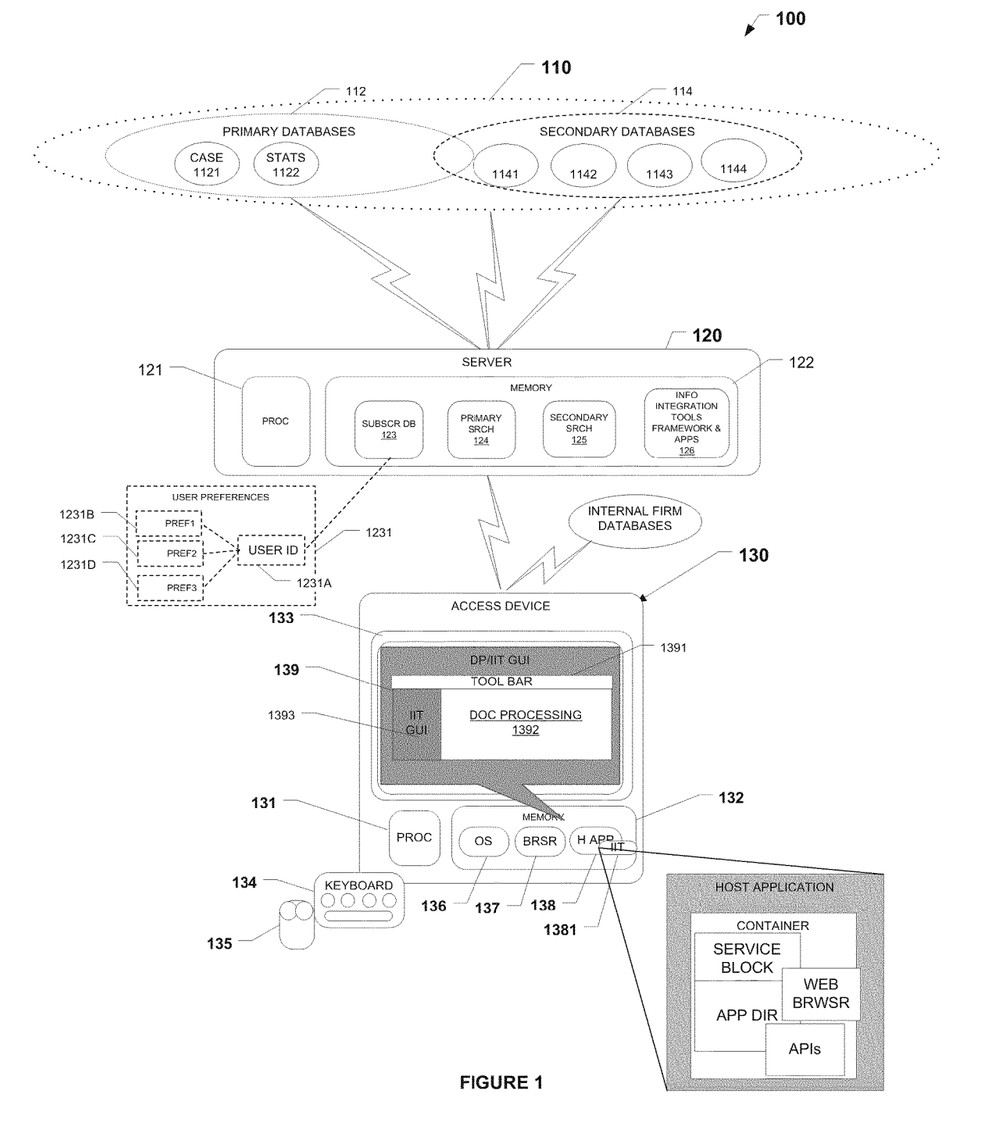
FIG. 1 is a block diagram of an exemplary document-processing and information-retrieval system, which corresponds to one or more embodiments of the present invention.

FIG. 1 shows an exemplary document-processing and information-retrieval system 100. Notably, the system includes at least one web server that can automatically control one or more aspects of an augmented document-processing application on a client access device. The document-processing application, for example, the Microsoft Word application, is augmented with an add-on framework that integrates into the graphical user interface of the application and includes a browser control that can access one or more web-based applications and allow macro-type scripts of the web-based applications or services control of the document processing application. System 100 includes one or more databases 110, one or more servers 120, and one or more access devices 130.

Exemplary Databases

Databases 110 include a set of primary databases 112 and a set of second databases 114. Primary databases 112, in the exemplary embodiment, include a caselaw database 1121 and a statutes database 1122, which respectively include judicial opinions and statutes from one or more local, state, federal, and/or international jurisdictions. Secondary databases 114, provide attorney, judge, law firm, product, and corporate profiles. Each of the corporate profiles includes one or more industry classification codes or indicators. In some embodiments, the caselaw documents are logically associated via a data structure with documents or profiles in databases 114. Other embodiments may include non-legal databases that include financial, scientific, or health-care information. Still other embodiments provide public or private databases, such as those made available through WESTLAW, INFOTRAC, and more generally any open web or Internet content.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Exemplary Server

Server 120 is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a primary search module 124, a secondary search module 125, and an information-integration-tools framework module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, primary search module 124, secondary search module 125, and information-integration—tools module 126.

Subscriber database 123 includes subscriber-related data for controlling, administering, and managing pay-as-you-go or subscription-based access of databases 110. In the exemplary embodiment, subscriber database 123 includes one or more preference data structures, of which data structure 1231 is representative. Data structure 1231 includes a customer or user identifier portion 1231A, which is logically associated with one or more operational, configuration, or usage preferences for one or more of modules 124, 125, or 126, such as preferences 1231B, 1231C, and 1231D.

Preference 1231B includes a default value governing whether document-processing tools are enabled or disabled for the associated user or customer. Preference 1231C includes a default value governing whether document metadata is stored in the subscriber database or locally with a user document. Preference 1231D includes default values governing one or more other aspects of usage or operation or configuration of the information-integration tools within module 126. For example, preference 1231D may include information defining one or more workflow sequences or templates. These sequences or templates may be defined by and/or purchased separately by the user or user's law firm or more generally employer. (In the absence of a temporary user override, for example, an override during a particular query or session, the default value governs.) In some embodiments, preference data may be stored locally on a user's access device in a local copy of one or more information-integration tools. Some embodiments store document context data that is extracted and/or derived from extracted document information. Examples include jurisdiction information, document type, document title, key legal entities from the document, judge and party names. In some instances, these are stored in association with a document ID, which may be defined by a user's local document management system. Other data stored in association with the user ID may include workflow progress information or indicators, attorney docket numbers, temporal usage indicators, such as session lengths, for billing purposes.

Primary search module 124 includes one or more search engines and related user-interface components, for receiving and processing user queries against one or more of databases 110. In the exemplary embodiment, one or more search engines associated with search module 124 provide Boolean, tf-idf, natural-language search capabilities.

Secondary search module 125 includes one or more search engines for receiving and processing queries against one or more of secondary databases 114. Some embodiments charge a separate or additional fee for searching and/or accessing documents from the secondary databases 114.

Information-integration-tools framework module 126 (or software framework or platform) includes machine readable and/or executable instruction sets for wholly or partly defining software and related user interfaces having one or more portions thereof that integrate or cooperate with one or more document-processing applications. Exemplary document-processing (or document-authoring or -editing) applications include word-processing applications, email applications, presentation applications, and spreadsheet applications. (More about the module 126 is described below.) In the exemplary embodiment, these applications would be hosted on one or more accesses devices, such as access device 130.

Exemplary Access Device

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and document processing software 138. (In the exemplary embodiment, memory 132 also includes document management software and time and billing system software not shown in the FIG. 1. In some embodiments, this software may be hosted on a separate server.)

In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of graphical user interfaces on display 133. In the exemplary embodiment, document processing software 138 includes Microsoft Word processing software, Powerpoint presentation software, Excel spreadsheet software, and Outlook email software. Document processing software 138 is shown integrated with information-integration tools 1381, which are downloaded from server 120 via a wired or wireless communication link. Upon launching of the document processing software an integrated document-processing and information-retrieval graphical-user interface 139 is defined in memory 132 and rendered on display 133.

Upon rendering, graphical-user interface 139 presents data in association with one or more interactive control features (or user-interface elements). In the exemplary embodiment, each of these control features takes the form of a hyperlink or other browser-compatible command input. User selection of some control features results in retrieval and display of at least a portion of the corresponding document within a region of the graphical-user interface 139 (not shown in this figure.) Although FIG. 1 shows regions as being simultaneously displayed, some embodiments present them at separate times.

More particularly, interface 139 includes document-processing tool bar region 1391, document-processing (editing and display) region 1392, and integrated information regions 1393. In the exemplary embodiment, region 1393 includes control and display elements for external content and services, such as a listing of one, two, or more web apps (or locally supported apps) provided by server 120 and databases 110, specifically the web apps and framework components of module 126. Region 1393 includes control and display elements for metadata content related to completing a task related to authoring a document loaded into document-processing (active editing) window 1392. For example, region 1393 may list contact data regarding all persons, such as law-firm and client personnel, opposing legal counsel and court personnel, and witnesses associated with a legal case for which the loaded document is being prepared. In some embodiments, region 1393 includes specific workflow information and control elements related to the user who launched the document-processing application and/or generic workflow information accessible via the user. In some embodiment, the user may select a workflow step or task within region 1393 and initiate update of the content or available tools and services of module 126.

Figure 2:
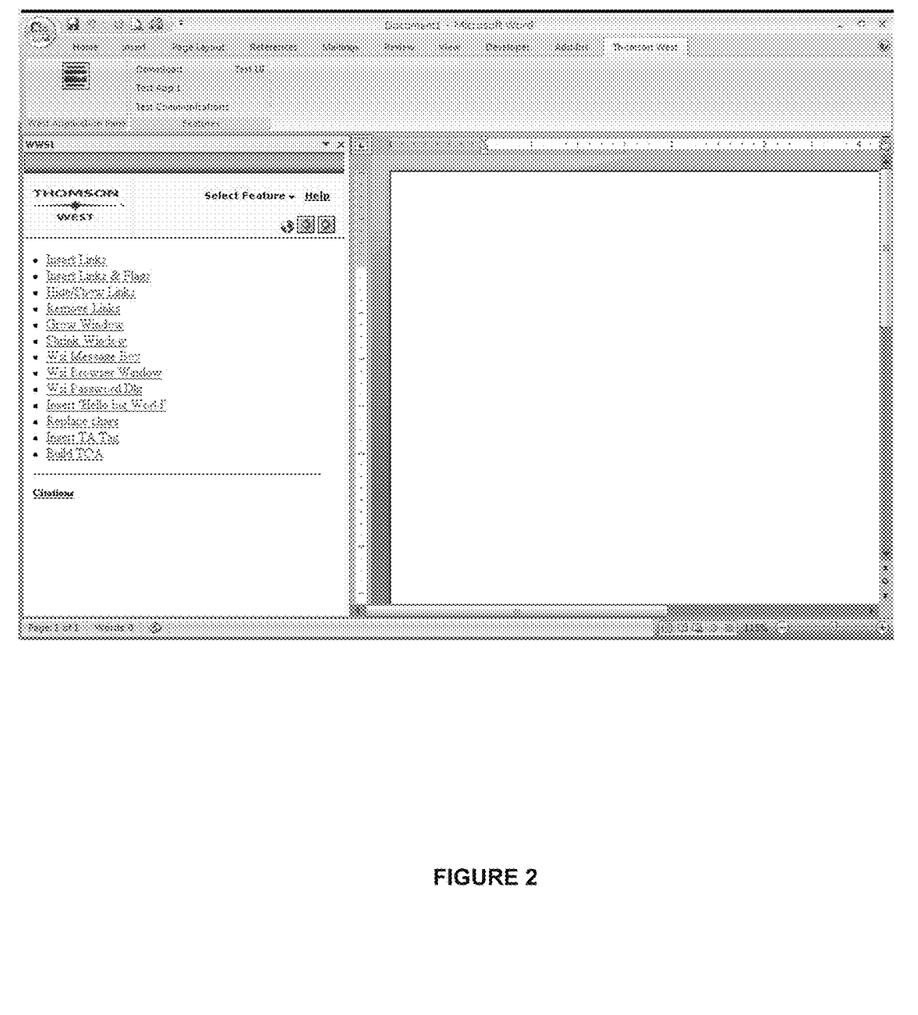
FIG. 2 shows a facsimile of an exemplary graphical user interface which may be incorporated into the system of FIG. 1 and which corresponds to one or more embodiments of the present invention.

Also, in the exemplary embodiment, the information integration tools include local desktop tools, such as BriefTools, CiteLink, DealProof, LiveNote, local server tools and services, such as West km knowledge management system, ES, and Elite accounting, and remote tools and services, such as KeyCite and other Thomson or third party tools and services. These tools are made available through an exemplary software platform or framework of module 126, one or more portions of which are downloaded and installed as an add-on or add-in framework and set of associated APIs to host application 138. FIG. 2 shows another exemplary embodiment of interface 139, as interface 200.

In the exemplary embodiment the framework generally allows for building applications that operate in a user desktop workflow scenario. The exemplary framework or platform can be broken down into the following layers or silos:

Hooks: Mechanism in the host application, such as a toolbar button in MS Word word-processing application to invoke the container Container: The area, such as a command bar object in MS Word application, where the feature applications are hosted.

Applications: Feature applications that support a specific set of features

Service Blocks: Infrastructure pieces that feature applications can leverage

Hooks

A hook, in the exemplary embodiment, is designed as a mechanism for users to open the container from a host application. The hook loads itself inside that host application and then loads the container. A hook also introduces a uniform way to see the content. The hook, through the use of application programming interfaces (APIs), provides a way to get at, extract, and/or insert data of the particular opened document within the host application. A host application could be any Microsoft® desktop application, WordPerfect®, Adobe Professional®, or a web browser (e.g., Internet Explorer, Netscape, FireFox, etc.). For example, the host application is Microsoft® Word. The exemplary embodiment provides single add-in for all supported Word versions. One way of achieving this support is to add an abstraction layer based on the use of reflection into the version specific library to allow the same code to work for all versions of Word. The abstraction layer is based on the most recent version, and falls back on earlier supported method calls if needed. It also fails gracefully when the functionality is missing in the Word version. Additionally, the layer implements changes to add-in to determine the correct version specific library to load and all method calls to Word object model using reflection.

For host application integration of the software platform, many interfaces provide support for including a hook that assists the host application to provide the user interface (UI) real-estate for the container as well as providing the integration mechanism itself. The UI real-estate is an area on the screen set aside for the container and a toolbar button. The host application is responsible for creating this space and creating an instance of Forms.DynamicContainer. Generally a window is created as the parent of the DynamicContainer. Additionally, the host is responsible for providing the ability to resize the area for the DynamicContainer.

The software platform is a managed .Net product so the CLR needs to be loaded into the host process. Currently the software platform provides some support and help for creating unmanaged host integrations using C++/COM. From a COM based language, the CLRLoader can be used to load the CLR into process, and invoke a designated managed class in a separate assembly to bridge into managed code and the rest of the add-in implementation. The CLRLoader is a COM object that can be created using standard COM methods (CoCreateInstance( )etc). It provides an interface that starts the CLR, and can load a managed class from an assembly with information provided in a configuration file. The managed class that is created by the CLRLoader must be given the HostShim Attribute and the user must define a method called "Configure" that returns a void and has a single "object" parameter. The software platform host application should implement the interface. Additionally, all the interfaces defined in the project, file document.cs are implemented on a set of classes to provide access to the document content of the host application.

Container

In some exemplary embodiments, the container is designed to host feature application features and functions. However, some embodiments host the feature application itself. Hosted within the container is a browser control or mini embedded browser. The browser control does application user interface (UI) rendering and script execution. An exemplary browser control is Internet Explorer but any web browser or equivalent would be acceptable as well. UI rendering refers to displaying the user interface of the feature application within the container. The feature application UIs are developed using html and CSS but some embodiments use other browser based technologies, such as ASP.Net pages, Silverlight applications, Adobe Flash applications, etc. Much of the functionality of the feature applications is implemented in the JavaScript programming language. Embedded in the browser control is a JavaScript execution engine that reads the script and performs the requested operations defined in the JavaScript program.

Feature Applications

Feature applications are designed with intent of reusing the software platform and functionality. They are developed independently but may be dependent on the software platform components. For example, one app inserts and updates flags. Assuming the software platform already has a communication service block and diagnostics service block (service blocks described in further detail below), the communication service block could be used to gather flag information and the diagnostics service block could be used to add tracing and logging into the application as well as add exception handling into the application.

Another example feature application provides linking to referenced documents. This feature application relies on Office Integration to provide a handle to the document in focus within Word. The application should also include the ability to select referenced documents for analysis. And assuming once again a diagnostics service block exists with the software platform, the diagnostics service block could be used to add tracing and logging into the application as well as add exception handling into the application.

There are a wide variety of ways to develop an application that can be hosted within the software platform container. At a minimum in the exemplary embodiment, the user needs to provide an XML feature file that informs the software platform where the HTML page for the UI resides and the HTML UI itself. The Features XML file is a simple XML document that contains the URL for the main UI for a given feature/application. It consists of a root element "", a single child element "" whose content is the URL of the HTML User Interface of the application. This features XML file is deployed to the users desktop. The UI can take the form of a static HTML page or other web application language. The inclusion of a script tag for the inject.cs script file facilitates access to the desktop injected items of the Host and ServiceLocator. The ServiceLocator is used to create instances of other Desktop Services by name. The UI location is constrained by the container, and thus influences design of the UI.

If the application needs to access content from within the software platform host application, the exemplary embodiment references the two JavaScript files (inject.cs and Load.cs) that are a part of the software platform main web package. JavaScript interacts with the desktop services provided. This gives access to a JavaScript reference to the "host" object as well as the "locator" ServiceLocator object. Finally, if the application provides a desktop service, the service implementation (See Software Platform Exemplary Service Practices section) is provided in an installable package.

Service Blocks

Feature applications call service blocks which are designed with the intent of reusability and expose the services of those feature applications. In other words, the purpose of service blocks is to supply local reusable components to a feature application. The functionality can be accessed via JavaScript and/or by referencing the necessary .net assemblies. Examples of application building platform components that can be leveraged are listed:

Application Activation
Basic licensing, Trial periods, Expiration
Developed from existing Deal Proof licensing
Note limitations
Citation Recognition and Validation
   Ability to make a request to the KeyCite flag web service using the Communications service block
   Validation into Citation Recognition
Common UI Widgets
   Message box function to display messages
      Message
      Ok button
      Cancel button Dialog box to retrieve user input
Progress meters—on the container and via popup dialog
Browser window
Resizing the container
Feature Activate/Deactivate events
Westlaw Password persistence
Communications Expose service object to do HTTP based requests
  Implement basic HTTP request
  Implements automatic Proxy discovery and configuration
  Implements async support
  Connectivity—Ping Westlaw.com
  Centralize web requests—application is responsible for reading the response
BriefTools SOAP service wrapper
Discovery
  Create Feature XML generation scheme for local and online features
  Implement Service XML generator.
  Integrate generators into Development environment and build procedure.
  Automatic detection for new applications (feature xml)
  Infrastructure to automatically detect when new service blocks are available
Applications can share functionality
Enterprise Library Application Blocks
  Add references to Enterprise Library application blocks
  Create service block wrappers for the following Enterprise Library application blocks:
  Caching Application Block
  Cryptography Application Block
  Data Access Application Block
  Exception Handling Application Block
  Logging Application Block
  Policy Injection Application Block
  Security Application Block
  Validation Application Block
Office Integration
  Provide a mechanism to retrieve the document in focus
Usage Tracking
  Support for usage tracking In the exemplary embodiment, developing a service exposed to the software platform-based feature applications entails the following:

1. Inherit the class from MarshalByRefObject.
2. Define a static factory method on the class that a user wants to expose. The return value should be of the Type that the user is going to create or else "object". Preferably, it does not take any parameters.
3. Apply the service attribute to the aforementioned static factory method.
4. During deployment, the service must be registered with the software platform service locator. This is accomplished by running the asmcfg.exe commandline utility with the -s option.

The interface in some embodiments can be implemented to reduce or minimize the number of calls into or out of the object because each service is configured to run in its own AppDomain which means that all calls into and out of the service incur the overhead of a cross AppDomain call.

Installation and Updating of Software Platform

One way for the user to deploy a software platform is to access a download site containing a base package for an application that includes a software platform built on a .NET framework and COM technology, a feature application, and, optionally, an updater. The user downloads this package and deploys the software platform along with the feature application and possibly the updater. Another option is to download and deploy the individual components separately in install order of the .NET framework, software platform, a feature application. The updater can be installed anytime after the software platform is installed. In the exemplary embodiment, the updater and the software platform are independent of each other.

Software Distribution Update

There are five exemplary methods for how to update the software distribution:

1. Direct from the provider's software platform server (on-site distribution server)—Updater directly
2. From remote provider's server (remote distribution server located within user's firewall)—Updater directly
3. Test Lab—User manually kicks off update process direct from provider server (on-site distribution server). User snapshots the changes to create his/her own installation package.
4. Manually get a copy of the software to install on a test workstation. Once o.k. on the test or base image, it is pushed out via SMS or another distribution package.
5. User wants the list of changed and files for the update and creates his/her SMS package from the documentation.

Help Function

The online help for the software platform is hosted on a web based help/knowledgebase platform that does not require software to be installed on users' desktops (it does require users to have an Internet connection). An exemplary help/knowledgebase platform is the Talisma® platform. Both the software platform container and products within the container have at least one Help link. Besides Help, no other end-user documentation specific to the container is needed. Associated installation tasks are covered in the documentation that is specific to products within the container.

When the container Help link is clicked, help content related to the container is accessible in a container help system. For example, when the Container Help link is clicked, users see "Using the Container" help content in the container help system. Additionally, product-specific help content could be provided as well.

Because the container functionality usually does not change substantially from version to version from a user perspective, the help system displays content for the latest version. However, the container help system could be versioned to account for different versions of the container that may be installed. A team might host the online Help for the software platform in the help/knowledgebase system so that it integrates with other Help systems for applications that are added to the container (e.g., Deal Proof®, WestCheck®, CiteAdvisor®, BriefTools®).

When a product Help link is clicked, the help content for that product is accessible. In addition, the container help content is also accessible within the product help system. For example, when a Deal Proof® Help link is clicked, users see both "Using Deal Proof" help content and "Using the Container" help content in the Deal Proof® help system.

Exemplary Method(s)

Figure 3:
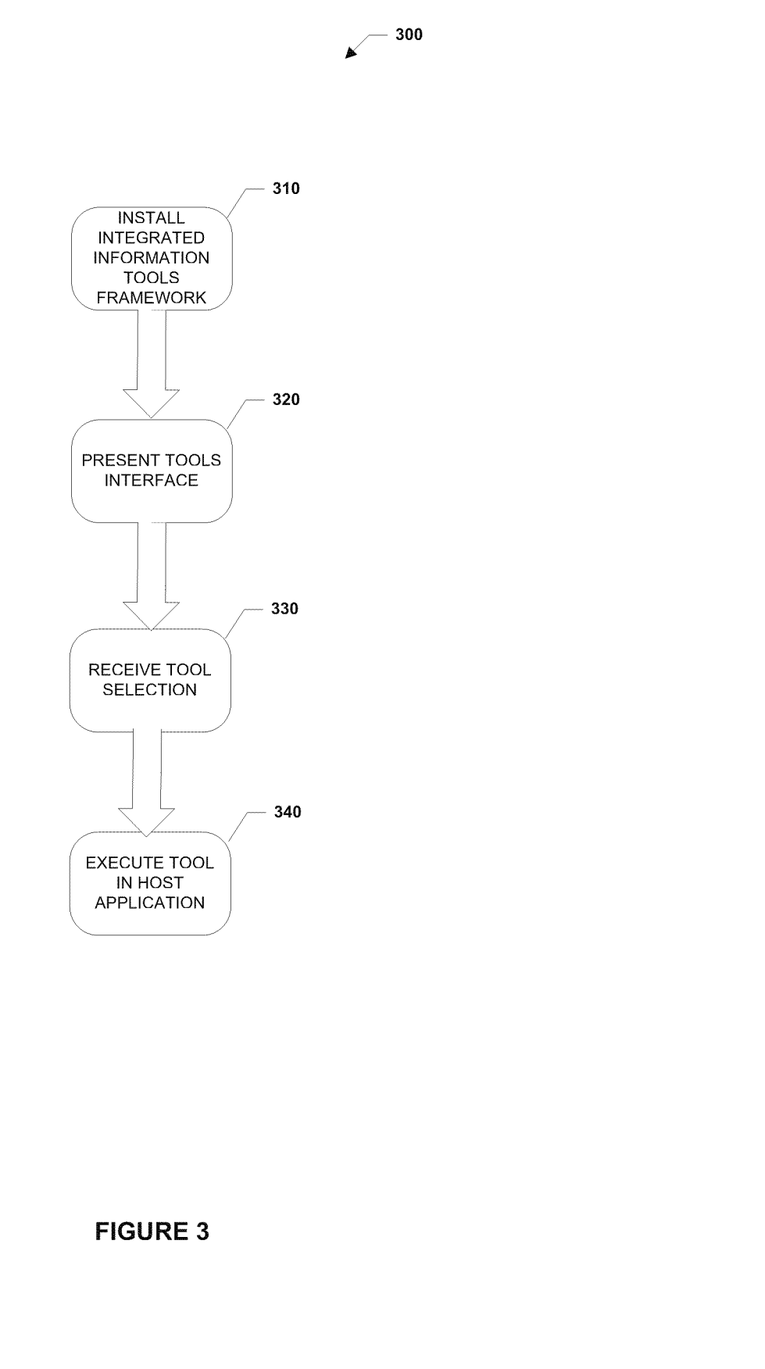
FIG. 3 is a flow chart of an exemplary method of operating the system of FIG. 1, which corresponds to one or more embodiments of the present invention.

FIG. 3 shows a flow chart 300 of one or more exemplary methods of operating a system, such as system 100. Flow chart 300 includes blocks 310-340, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

Block 310 entails installing an add-on framework and one or more tools or APIs on server 120 onto one or more client devices. In the exemplary embodiment, this entails a user directing a browser in a client access device, such as client access device 130, to internet-protocol (IP) address for an online information-retrieval system, such as the Westlaw system and then logging onto the system using a username and/or password. Successful login results in a web-based interface being output from server 120, stored in memory 132, and displayed by client access device 130.

The interface includes an option for initiating download of information integration software with corresponding toolbar plug-ins for one or more applications. If the download option is initiated, download administration software ensures that the client access device is compatible with the information integration software and detects which document-processing applications on the access device are compatible with the information integration software. With user approval, the appropriate software is downloaded and installed on the client access device 130 as information integration tools framework 1381. Execution continues at block 320.

Block 320 entails presenting an online tools interface to a user in context with a document-processing application. In the exemplary embodiment, this entails a user launching and opening or creating a document using one or more of the following independent applications: Microsoft Word word processing application, Corel WordPerfect word processing application, Internet Explorer browser application, Adobe Acrobat desktop publishing application, and Microsoft Outlook email application. Add-on software for one or more of these applications is simultaneously invoked, which in turn results in presentation of the add-on menu, for example as shown in FIG. 2. The add-on menu includes a listing of web services or applications and/or locally hosted tools or services.

Block 330 entails receiving a selection from a user via the tools interface. In the exemplary embodiment this selection is made manually via a pointing device. Execution continues at block 340.

Block 340 entails executing the selected tool, or more precisely its associated instructions. In the exemplary embodiment, this entails communicating with corresponding instructions or web application on server 120, which in turn may provide dynamic scripting and control of the host word-processing application using one or more APIs stored on the host application as part of the add-on framework.

An alternative or supplementary process flow follows, wherein WSF denotes the framework:

1. The user launches the host application (i.e. Microsoft Word, WordPerfect, etc.) to work on a document.
2. The WSF is loaded as an Add-in to the host application.
   a. This will load the WSF Document API, the WSF Application Container, initialize the installed Application List, and create the UI elements (Ribbons, toolbars, menu items, etc.)
3. The user opens a document and selects the desired WSF Application from a list of applications presented in region 1393 (FIG. 1) via the integrated UI elements.
   a. WSF displays the application within the WSF Container (region 1393)
      i. WSF navigates the embedded browser to the applications base URL (server 120, appropriate portion of module 126)
         1. If the application changes, a new/upgrade install may or may not be required
         2. WSF applications can be installed and run as:
            a. Local HTA (i.e. locally installed HTML, JS, CSS, etc.)
            b. Enterprise web application (intranet or extranet)
            c. Internet web application
      ii. WSF injects the WSF Document API references into the JavaScript execution engine for access from the applications JavaScript
   b. The document in display (active edit window of host application, such as word-processing application) preserves the context of the application in WSF (i.e. each document has its own instance of WSF which can be customized based on user preferences)
4. The WSF JavaScript execution engine allows the application code to run.
5. The application can use the WSF APIs to access the contents of the opened host application (i.e. Microsoft Word, WordPerfect, etc.) documents, including modifications to these documents.
   a. The WSF API's exposed to the client include but are not limited to:
      i. The collection of Open Documents, including API methods for accessing Document specific data.
      ii. The collections of Paragraphs, Footnotes, Endnotes, Tables of Authority, hyperlinks, images and many other document content objects within a specific open document.
      iii. The ability to create a Location object to represent a given textual location within the document.
   b. The WSF API methods that are called by the application in turn will call methods exposed by the Host application (ex. Microsoft Word). The manner in which these calls are done is Host application specific and dependent on facilities exposed by the Host application. The WSF manages the mappings between its own API and the functionality exposed by the Host.
   c. Additionally, the application can use native browser capabilities and other WSF functionality to communicate with web services available locally on the host machine, at enterprise (intranet or extranet), or the over the internet.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A method of controlling client applications, the method comprising:
    generating on a client access device a graphical user interface of a word processing application integrated with an add-on framework, the graphical user interface including a document opened by the word processing application;
    identifying one or more document context indicators derived from text of the document, the one or more document context indicators comprising at least a legal document type, jurisdiction and governing law;
    associating a unique document identifier with the document and the one or more document context indicators;
    storing the unique document identifier and the one or more document context indicators in a user data structure associated with a user, the user data structure further comprising a set of user preferences based on user input and monitored user activity in the word processing application;
    identifying a plurality of web processing applications stored on a web server based on the one or more document context indicators and the set of user preferences;
    presenting the plurality of web applications stored on the web server corresponding to the identified document context indicators and the set of user preferences;
    receiving a user selection of one of the plurality of web applications comprising a selection of a user-interface element associated with the web application via the add-on framework;
    initiating the web application of the web server via the add-on framework of the client access device in accordance with the user selection;
    receiving a call to an application program interface of the add-on framework from the web application using a script execution engine of the add-on framework to at least one of access and modify content of the document opened by the word processing application; and
    calling from the add-on framework an exposed method of the word processing application that corresponds to the call to the application program interface to at least one of access and modify content of the document opened by the word processing application, said exposed method comprising collecting one or more document data elements of the document opened by the word processing application and the creation of a location object representative of a textual location within the document opened by the word processing application.

2. The method of claim 1, wherein initiating the web application comprises:
    launching the word processing application on the client access device to open the document in a first portion of the graphical user interface associated with the word processing application; and
    loading the add-on framework in a second portion of the graphical user interface to display a plurality of user-interface elements associated with the plurality of web applications stored on the web server that correspond to the plurality of user-interface elements.

3. The method of claim 2, wherein receiving a user selection of web application comprises receiving a user selection of a user-interface element associated with the web application via the add-on framework.

4. The method of claim 2, wherein loading the add-on framework further comprises:
    executing a web browser application in the second portion of the graphical user interface; and
    navigating the web browser to a web page provided by the web server that lists the plurality of user-interface elements associated with the plurality of web applications.

5. The method of claim 4, wherein receiving a user selection of a web application further comprises receiving a user selection of a user-interface element associated with the web application via the web page of the add-on framework.

6. The method of claim 1, wherein the method further comprises executing an execution engine in the add-on framework to execute the application program interface in response to a call to the application program interface from the web application.

7. The method of claim 1, wherein the method further comprises managing a mapping in the add-on framework between the application program interface and the exposed application method of the word processing application.

8. The method of claim 1, wherein the call to the application program interface includes at least one call comprising: extracting information from the document; and enhancing the document based on the extracted information.

9. The method of claim 8, wherein enhancing the document comprises at least one of adding relevant content to the document and validating citations found in the document.

10. A system to control client applications, the system comprising:
    a web server including a memory that stores a plurality of web applications; and
    a client access device including a processor and a memory that stores instructions which when executed by the processor, cause the processor to perform operations comprising:
        generating a graphical user interface of a word processing application integrated with an add-on framework, the graphical user interface including a document opened by the word processing application;
        identifying one or more document context indicators derived from text of the document, the one or more document context indicators comprising at least a legal document type, jurisdiction and governing law;
        associating a unique document identifier with the document and the one or more document context indicators;
        storing the unique document identifier and the one or more document context indicators in a user data structure associated with a user, the user data structure further comprising a set of user preferences based on user input and monitored user activity in the word processing application;
        identifying a plurality of web processing applications stored on a web server based on the one or more document context indicators and the set of user preferences;
        presenting the plurality of web applications stored on the web server corresponding to the identified document context indicators and the set of user preferences;
        receiving a user selection of one of the plurality of web application applications comprising a selection of a user-interface element associated with the web application via the add-on framework;
        initiating the web application of the web server via the add-on framework in accordance with the user selection;

receiving a call to an application program interface of the add-on framework from the web application using a script execution engine of the add-on framework to at least one of access and modify the content of the document opened by the word processing application; and calling from the add-on framework an exposed application method of the word processing application that corresponds with the call to the application program interface to at least one of access and modify the content of the document opened by the word processing application, said exposed method comprising collecting one or more document data elements of the document opened by the word processing application and the creation of a location object representative of a textual location within the document opened by the word processing application.

11. The system of claim 10, wherein operations further comprise:

launching the word processing application to open the document in a first portion of the graphical user interface associated with the word processing application; and loading the add-on framework in a second portion of the graphical user interface to display the plurality of user-interface elements associated with the plurality of web applications stored on the web server that correspond to the plurality of user-interface elements.

12. The system of claim 11, wherein the operations further comprise initiating the web application in response to receiving a user selection of a user-interface element associated with the web application via the add-on framework.

13. The system of claim 11, wherein the operations further comprise:

executing a web browser application in the second portion of the graphical user interface; and navigating the web browser to a web page provided by the web server that lists the plurality of user-interface elements associated with the plurality of web applications.

14. The system of claim 13, where in the operations further comprise executing a user selection of a user-interface element associated with the web application via the web page of the add-on framework.

15. The system of claim 10, wherein the operations further comprise executing an execution engine in the add-on framework to execute the application program interface in response to a call to the application program interface from the web application.

16. The system of claim 10, wherein the operations further comprise managing a mapping in the add-on framework between the application program interface and the exposed application method of the word processing application.

17. The system of claim 10, wherein the web application is configured to process at least one legal citation within the document opened by the word processing application.

* * * * *